United States Patent
Yang

Patent Number: 6,108,059
Date of Patent: Aug. 22, 2000

[54] REFLECTIVE DISPLAY HAVING A LAMINATED STRUCTURE OF A POLARIZER AND QUARTER WAVE PLATE BEING ATTACHED TO A LIGHT GUIDE PLATE

[75] Inventor: Ying Bao Yang, Kanagawa, Japan

[73] Assignee: Sony Corporation, Tokyo, Japan

[21] Appl. No.: 09/264,242

[22] Filed: Mar. 8, 1999

[30] Foreign Application Priority Data

Mar. 10, 1998 [JP] Japan .................................. P10-076698

[51] Int. Cl.⁷ .............................. G02F 1/1335; F21V 7/04
[52] U.S. Cl. ................................ 349/65; 349/96; 349/61; 349/117; 349/63; 362/31; 362/32
[58] Field of Search .................. 349/61, 62, 63, 349/65, 96, 98, 117; 359/487, 495; 385/146; 362/32, 19, 31

[56] References Cited

U.S. PATENT DOCUMENTS

| | | | |
|---|---|---|---|
| 4,642,736 | 2/1987 | Masuzawa et al. | 362/31 |
| 5,050,946 | 9/1991 | Hathaway et al. | 385/33 |
| 5,341,231 | 8/1994 | Yamamoto et al. | 359/49 |
| 5,418,631 | 5/1995 | Tedesco | 359/15 |
| 5,485,354 | 1/1996 | Ciupke et al. | 362/31 |
| 5,587,816 | 12/1996 | Gunkima et al. | 349/62 |
| 5,712,694 | 1/1998 | Taira et al. | 349/9 |
| 5,808,709 | 9/1998 | Davis et al. | 349/65 |
| 5,917,565 | 6/1999 | Suzuki | 349/65 |
| 5,982,540 | 11/1999 | Koike et al. | 359/487 |
| 5,999,243 | 12/1999 | Kameyama et al. | 349/185 |

FOREIGN PATENT DOCUMENTS

| | | |
|---|---|---|
| 0 770 818 A2 | 5/1997 | European Pat. Off. |
| WO 93/16410 | 8/1993 | WIPO |

*Primary Examiner*—William L. Sikes
*Assistant Examiner*—Tarifur R. Chowdhury
*Attorney, Agent, or Firm*—Ronald P. Kananen; Rader, Fishman & Grauer

[57] ABSTRACT

An illumination structure which is for viewing an image in a dark environment without deterioration of image quality in a bright environment is incorporated in a reflective display. A reflective display comprises a panel, a light guide plate, and a light source. The panel is provided with a transparent first substrate located on the incident side of the outside light, a second substrate bonded to the first substrate with interposition of a prescribed space and located on the side opposite to the first substrate, a liquid crystal layer held in the space between both substrates, and an electrode for applying a voltage to the liquid crystal layer. The light guide plate is placed on the outside of the first substrate. The light source is located on the end of the light guide plate, and emits the illumination light as required. The light guide plate allows the outside light to be transmitted, which is incident on the first substrate, and allows the outside light reflected on the second substrate to come out. On the other hand, the light guide plate guides the illumination light as required, which is incident on the first substrate, and allows the illumination light reflected on the second substrate to come out. A laminate structure comprising a polarization plate and a quarter wavelength plate placed one on the other is attached on the light guide plate, and shuts off the outside light or illumination light unnecessary reflected on the first substrate of the panel.

5 Claims, 6 Drawing Sheets

—— ZERO ORDER DIFFRACTED LIGHT

---- FIRST ORDER DIFFRACTED LIGHT

—— ZERO ORDER DIFFRACTED LIGHT

---- FIRST ORDER DIFFRACTED LIGHT

REFLECTIVE DISPLAY HAVING A LAMINATED STRUCTURE OF A POLARIZER AND QUARTER WAVE PLATE BEING ATTACHED TO A LIGHT GUIDE PLATE

BACKGROUND OF THE INVENTION

1. Field of the Invention

This invention relates to a reflective display for displaying using outside light such as natural light and more particularly to an illumination structure of a reflective display used supplementally when there is only a little outside light.

2. Description of the Related Art

Display apparatuses which use a liquid crystal as an electro-optical substance are advantageous in that the structure is made in the form of a flat panel that is thin and light weight, and its power consumption is low. Therefore, such display apparatuses have been developed as displays of mobile apparatuses. An electro-optical substance such as a liquid crystal does not emit the light, but displays an image by allowing the outside light to be transmitted or shut off selectively. Such passive display apparatus is categorized into a transmission type and a reflection type depending on illumination type.

In a transmission display apparatus, a panel which holds, for example, a liquid crystal as an electro-optical substance between a pair of transparent substrates is fabricated. A light source (i.e., a "back light") for illumination is provided on the back side of the panel. An image is observed from the front of the panel. In the case of a transmission type, a back light is indispensable and, for example, a cold cathode tube is used as the light source. As the result, a back light consumes the major part of power among components in a whole display. Therefore the transmission type is not suitable as a display of a mobile apparatus. On the other hand, in a reflective display, a reflection plate is provided on the back side of a panel, and an outside light such as natural light is incident from the front. An image is observed from the front utilizing the reflected light. Differently from the transmission type, a light source for back lighting is not used in the reflection type; therefore the power consumption is relatively low in the reflection type, and is thus suitable as a display of a mobile apparatus. However, because an image can not be viewed in an environment of scarce outside light such as at night time in the case of a reflective display, this is a problem to be solved.

SUMMARY OF THE INVENTION

An apparatus using means hereinunder is devised for solving the problem of the above-mentioned conventional art. In detail, a reflective display in accordance with the present invention is basically provided with a panel, a light guide plate, and a light source. The panel is provided with a transparent first substrate located on the incident side of the outside light, a second substrate bonded to the first substrate with interposition of a prescribed space and located on the side opposite to the first substrate, an electro-optical substance held in the space, and an electrode for applying a voltage to the electro-optical substance formed at least on any one of the first substrate and the second substrate. The light guide plate consists of a transparent material and placed on the outside of the first substrate. The light source is provided on the end of the light guide plate for emitting the illumination light as required. The reflective display in accordance with the present invention is featured in that the light guide plate normally allows the outside light to be transmitted, which is incident on the first substrate, and allows the outside light reflected on the second substrate to come out, on the other hand, the light guide plate guides the illumination light as required, which is incident on the first substrate, and allows the illumination light reflected on the second substrate to come out. The reflective display is further featured in that a polarization plate and a quarter wavelength plate are attached on the light guide plate one on the other, and the outside light or the illumination light reflected unnecessarily on the first substrate of the panel is shut off.

Preferably, the panel uses a liquid crystal layer as the electro-optical substance which functions as a quarter wavelength plate depending on application of a voltage. In this case, the liquid crystal layer consists of a twist-oriented nematic liquid crystal layer having the positive dielectric anisotropy, functions as a quarter wavelength plate when no voltage is applied, and loses the quarter wavelength plate function when a voltage is applied. Further preferably, the light guide plate has plane portions divided in the form of stripe and slant portions located between adjacent plane portions, and functions to reflect the illumination light guided from the light source on the respective slant portions toward the first substrate, and functions to allow the illumination light reflected on the second substrate to come out from the respective plane portions.

According to the present invention, the light guide plate is placed on the front side of the reflection panel and the light source is located on the end of the panel. The light source is lighted in a dark environment, the illumination light is incident on the panel side through the light guide plate to display an image. The light source is switched off in a bright environment, and an image is displayed utilizing directly the outside light though the transparent light guide plate. The light guide plate is basically transparent, and does not cause any difficulty in viewing an image in a bright environment. As described herein above, according to the present invention, the light source may be lighted only when it is required. As a result, the power consumption is reduced significantly as a whole display, and the reflective display is suitable as a display of a mobile apparatus. In addition to the above-mentioned basic effect, the present invention provides a device to improve the image quality. In detail, a polarization plate and a quarter wavelength plate are previously attached on the back side of the light guide plate, and the laminate structure is placed on the front side of the panel. The optically anisotropic axis (i.e., an "optical axis") of the quarter wavelength plate is disposed so as to make an angle of 45 degrees to the polarization axis of the polarization plate. The laminate structure of the polarization plate and the quarter wavelength plate allows the outside light or the illumination light to be transmitted, on the other hand, and shuts off the outside light or the illumination light reflected unnecessarily on the panel. For example, unnecessary interfacial reflection by an electrode formed on the first substrate on the incident side is suppressed. As the result, interference fringe due to a periodical prism structure (i.e., a diffraction grating) of the light guide plate is suppressed, and a good display is obtained. Further, unnecessary reflection on the surface of the first substrate on the incident side is also suppressed. As the result, deterioration of image contrast displayed on the panel is prevented.

BRIEF DESCRIPTION OF THE DRAWINGS

FIG. 1 shows use of the reflective display in a dark environment.

DESCRIPTION OF THE PREFERRED EMBODIMENTS

Figure 1:
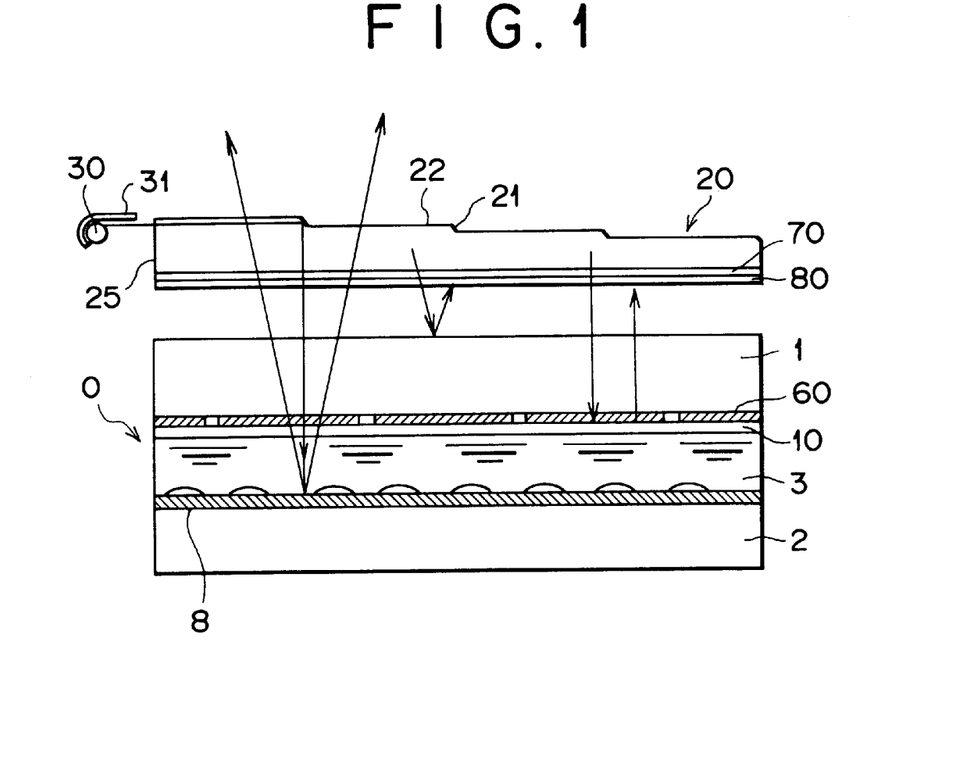
FIG. 1 is a partial cross sectional view for illustrating an embodiment of a reflective display in accordance with the present invention.

Embodiments of the present invention will be described in detail hereinafter with reference to the drawings. FIG. 1 is a schematic cross sectional view for illustrating an embodiment of the reflective display in accordance with the present invention. As shown in the drawing, this reflective display is composed basically of a panel 0, a light guide plate 20, and a light source 30. The panel 0 is provided with a transparent first substrate 1 made of glass for example, located on the incident side of the outside light, a second substrate 2 located in contact with the first substrate 1 with interposition of a certain space on the opposite side, and an electro-optical substance such as a liquid crystal layer 3, or nematic liquid crystal for example, held in the space between both substrates. The transparent first substrate 1 made of glass, for example, is provided with a color filter 60, or pigment-dispersed photoresist for example, in addition to an electrode 10 made of ITO for example, and a voltage is applied to the liquid crystal layer 3. The second substrate 2 made of glass, for example, is provided with a light reflection layer 8 made of aluminum for reflecting the outside light. The light reflection layer 8 functions also as an electrode for applying a voltage to the liquid crystal layer 3. Therefore, in this embodiment, electro-optical characteristics are controlled by applying a voltage from the top and bottom electrodes to the liquid crystal layer 3. However, the present invention is by no means limited to this embodiment; alternatively, in some cases depending on the operation mode of electro-optical substance, only one electrode may be provided at least on any one of the first substrate 1 and the second substrate 2. The light reflection layer 8 has, for example, convexes 8a to diffuse the light.

The light guide plate 20, or a transparent acrylic sheet for example, may be provided separately from the panel 0 and may be provided on the outside surface of the first substrate 1. In the drawing, to emphasize that the light guide plate 20 and the panel 0 are formed separately, a space is provided between both components. The light source 30 which is for example a cold cathode fluorescent tube, is contained in the reflecting mirror 31, and disposed on the end of the light guide plate 20, and emits an illumination light as required. The light guide plate 20 allows the outside light which has been transmitted through the first substrate 1 and reflected from the light reflection layer 8 of the second substrate 2 to come out normally. On the other hand, the light guide plate 20 is used to allow the illumination light which has been guided from the light source to enter into the first substrate 1 and reflected from the light reflection layer 8 of the second substrate 2 to come out as required. The structure is featured in that a polarization plate 70 made of, for example, an optically anisotropic macromolecular film and a quarter wavelength plate 80 made of, for example, a uniaxially stretched macromolecular film are placed on the back side of the light guide plate 20 one on the other. For example, a polarization plate 70 is bonded on the back side of the light guide plate 20 with an adhesive, and further a quarter wavelength plate 80 is bonded on the back side of the polarization plate 70 with an adhesive. Both plates 70 and 80 are disposed so that the optical axis of the quarter wavelength plate 80 and the polarization axis of the polarization plate 70 are oriented to make an angle of 45 degrees to each other. The laminate structure of the polarization plate 70 and the quarter wavelength plate 80 allows the outside light or the illumination light emitted from the light source 30 to be transmitted toward the panel 0. Further, the laminate structure of the polarization plate 70 and the quarter wavelength plate 80 allows the outside light reflected from the light reflection layer 8 formed on the second substrate 2 side or the illumination light to be transmitted. However, the laminate structure of the polarization plate 70 and the quarter wavelength plate 80 shuts off the outside light or illumination light reflected unnecessarily from the first substrate 1 side of the panel 0. For example, the laminate structure of the polarization plate 70 and the quarter wavelength plate 80 shuts off the outside light or illumination light reflected unnecessarily from the surface of the first substrate 1 to result in the enhanced display contrast. Also, the laminate structure of the polarization plate 70 and the quarter wavelength plate 80 shuts off the outside light or the illumination light reflected unnecessarily on the interface between the color filter 60 and the electrode 10.

In this embodiment, a liquid crystal layer 3, for example, which functions as a quarter wavelength plate correspondingly to the applied voltage is used as the electro-optical substance for the panel 0. The liquid crystal layer 3 consists of a twist-oriented nematic liquid crystal layer having the positive dielectric anisotropy, functions as a quarter wavelength plate during no application of a voltage and does not function as a quarter wavelength plate during application of a voltage. The light guide plate 20 has separated band plane portions 22 and slant portions 21 located between respective plane portions 22. The illumination light guided from the light source 30 is reflected on the slant portions 21 and comes into the first substrate 1, and the illumination light reflected from the second substrate 2 comes out from the plane portions 22.

Figure 2:
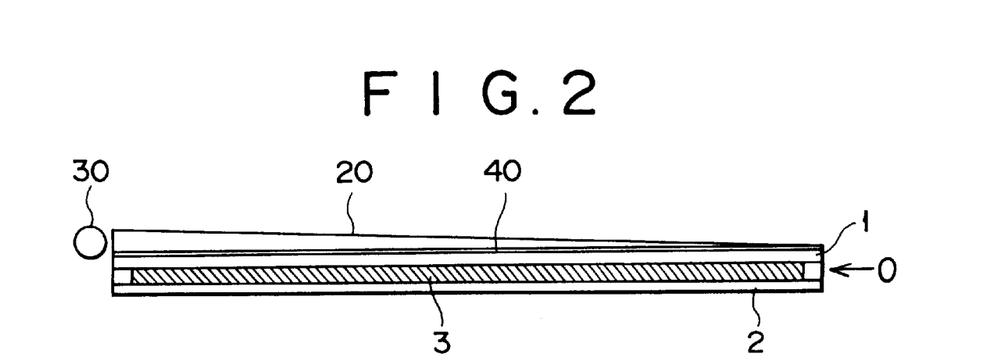
FIG. 2 is a cross sectional view for illustrating a reference example of a reflective display.

FIG. 2 is a schematic cross sectional view for illustrating an reference example of a reflective display. This reference example shows comparison in order to clarify the usefulness of the present invention. In this reference example, a light guide plate 20 and a first substrate 1 of a panel 0 are bonded to each other with interposition of a transparent interposition layer 40 made of, for example, resin. Unnecessary reflection of the illumination light and outside light on the interface between the light guide plate 20 and the first substrate 1 is suppressed by setting adequately the refractive index of the interposition layer 40. In other words, in this reference example, the interposition layer 40 is used instead of the laminate structure of the polarization plate and the quarter wavelength plate in order to suppress the unnecessary reflection. The interposition layer 40 may consist of, for example, an adhesive transparent resin. A transparent resin is coated on the surface of the first substrate 1 of the panel, and a light guide plate 20 is adhered on it. It is required to match optically in order to suppress unnecessary reflection. The resin of the interposition layer 40 and the resin of the light guide plate 20 and the first substrate 1 are selected so that the refractive indices of these resins are approximately equal. For example, when the first substrate 1 consists of glass, the refractive index of the resin which forms the interposition layer 40 should be approximately 1.5. In order to ensure no inclusion of bubbles between the light guide plate 20 and panel 0 when they are bonded, the resin with a low viscosity is desirably used.

Figure 3A:
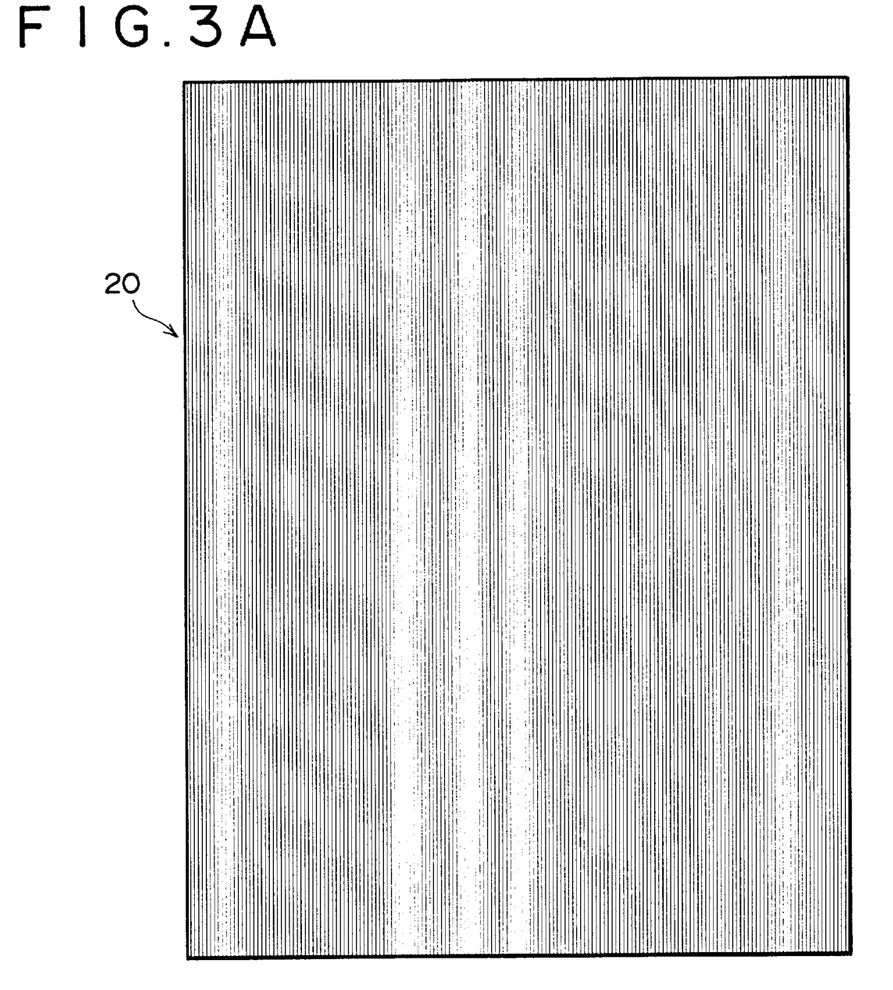
FIGS. 3A to 3C are schematic views for illustrating a light guide plate used for the reference example shown in FIG. 2.
Figure 3B:
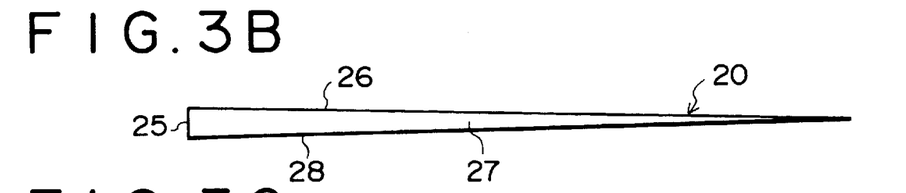
Figure 3C:
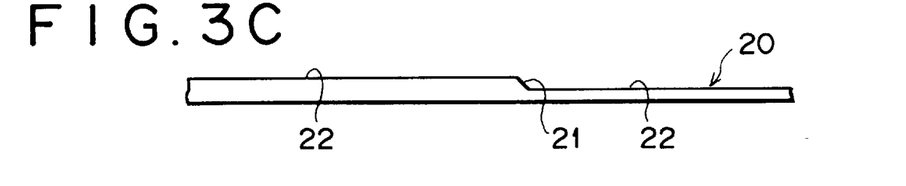

FIGS. 3A to 3C show the detailed structure of the light guide plate 20 shown in FIG. 2. FIG. 3A shows a plane view, FIG. 3B shows a cross sectional view, and FIG. 3C shows an enlarged cross sectional view. The bottom side 28 of the sheet-like light guide plate 20 is bonded on the pane 10. When, adhesive resin stuck on the end 25, upper surface 26, and side surface 27 of the light guide plate 20 may degrade the optical function. Therefore, when the light guide plate 20 and the panel 0 are bonded together with an ultra-violet curing resin, it is required to cover the end 25, upper surface 26, and side surface 27 of the light guide plate 20 with a tape. After bonding, the light guide plate 20 and the panel 0 are combined together.

Actually, in the case that the light guide plate is installed on the front surface of the panel, if an air layer is interposed between the light guide plate and the panel, because the refractive index of air is not equal to that of the light guide plate and also is not equal to that of the panel, the incident light is reflected approximately 10%. Such reflected light is not involved in electro-optical switching of the panel; it therefore makes the contrast of the reflective display very poor. To cope with such interfacial reflection, in the reference example shown in FIG. 2, the light guide plate 20 and the panel 0 are bonded together with a transparent resin having the refractive index approximately equal to those of the light guide plate and the panel. However, such bonding work is troublesome, and results in complex manufacturing process and reduced manufacturing yield. For example, in some cases, excessive adhesive is excluded from the space between the light guide plate and the panel when both members are bonded together, and the appearance of the reflective display becomes poor if adhesive is carelessly stuck on other members. On the other hand, in the case of the structure of the present invention shown in FIG. 1, it is possible to suppress unnecessary reflection of the panel 0 only by attaching the laminate structure comprising the polarization plate and the quarter wavelength plate on the back side of the light guide plate. Another method in which a reflection preventing film like, for example, a multilayer film is formed on the back surface of the light guide plate and the surface of the panel has been known as a method for suppressing unnecessary reflection on the interface between the light guide plate and the panel. However, the forming of a reflection preventing film clearly leads to increased manufacturing cost. On the other hand, a polarization plate and a quarter wavelength plate used in the present invention are originally used as indispensable components of a reflective display, and therefore does not lead to increased manufacturing cost basically.

Figure 4:
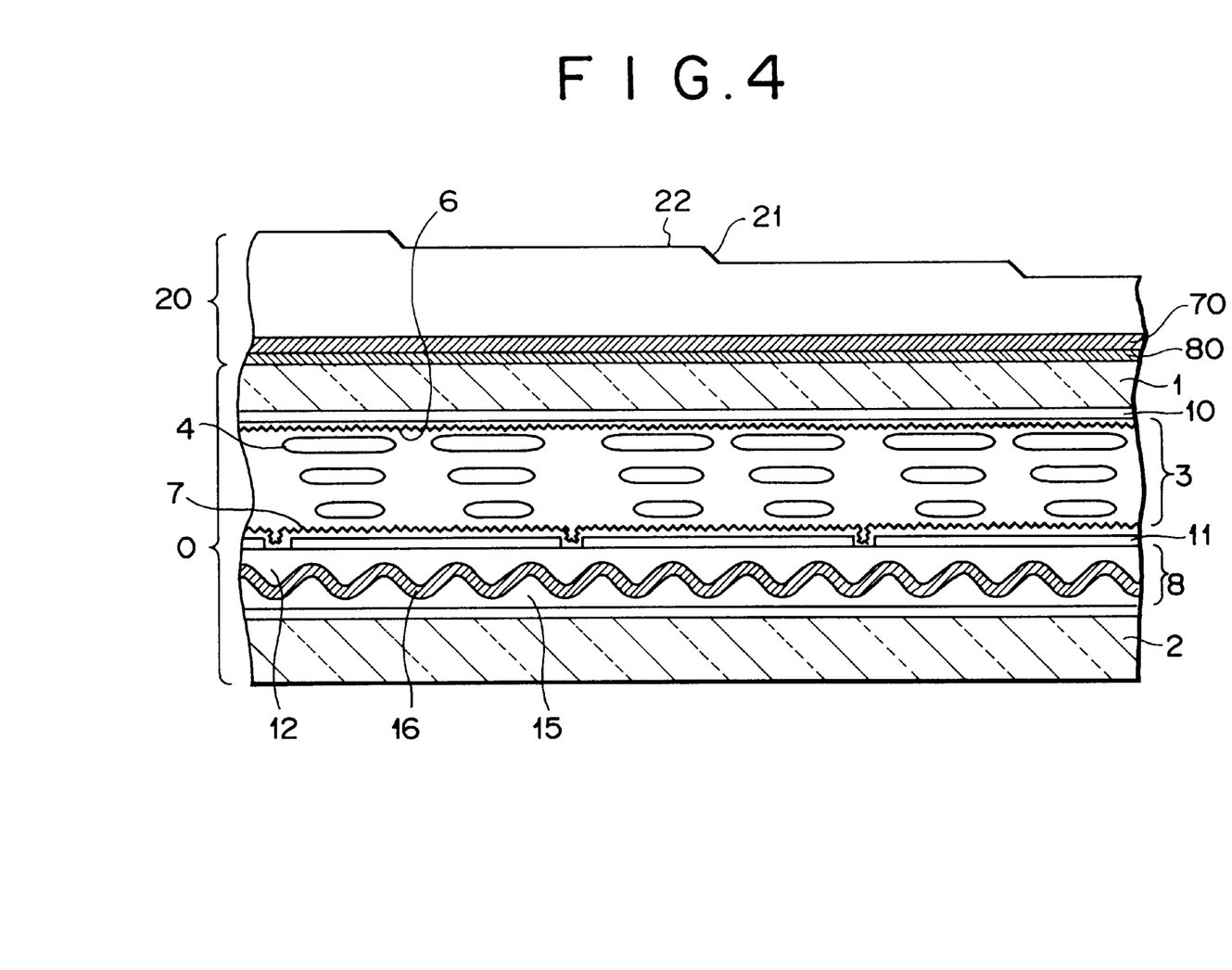
FIG. 4 is a cross sectional view for illustrating an example of a reflective display in accordance with the present invention.

FIG. 4 is a partial cross sectional view for illustrating a detailed example of the reflective display in accordance with the present invention. Components corresponding to those of the embodiment shown in FIG. 1 are given the same reference characters as shown in FIG. 1 for easy understanding. In this example, a TN-ECB (Twist Nematic-Electrically Controlled Birefringence) mode liquid crystal panel is used. As shown in the drawing, this reflective display has the structure in which the independent light guide plate 20 and panel 0 are combined together. The slant portion 21 and the plane portion 22 are formed on the surface of the light guide plate 20. The light guide plate 20 has a size of, for example, 90×120 mm, the thickness of the end on the side near the light source is, for example, 3.2 mm, and the thickness of the end on the side opposite to the light source is 0.2 mm. The light guide plate consists of, for example, transparent acrylic board, and the slant portion 21 and the plane portion 22 are subjected to machine work with a diamond cutter having an inclination angle of 135 degrees. The location period of the slant portion 21 is, for example, 120 $\mu$m.

The polarization plate 70 and the quarter wavelength plate 80 are attached on the back side of the light guide plate 20. The light guide plate 20 having the laminate structure as described herein above is placed on the surface of the panel 0. The panel 0 is a component formed by bonding the first substrate 1 made of, for example, a transparent glass plate located on the incident side of the outside light on the second substrate 2 located on the opposite side with interposition of a prescribed space. The nematic liquid crystal layer 3, for example, is held in the space between both substrates 1 and 2. The liquid crystal molecules 4 are twist oriented by the top and bottom orientation films 6 and 7. Electrodes 10 and 11 are formed on the inside surface of respective substrates 1 and 2, and a voltage is applied to the nematic liquid crystal layer 3 on every pixel. In this example, the electrode 10 formed on the first substrate 1 is patterned in the form of a stripe, and the electrode 11, made of ITO for example, formed on the second substrate 2 is patterned in the form of a stripe. Both electrodes 10 and 11 are disposed orthogonally each other, and form a so-called simple matrix on which a pixel is formed on each intersection. The reflection liquid crystal display apparatus having the structure as described herein above is a TN-ECB type normally white mode apparatus. The nematic liquid crystal layer 3 holds twist orientation and functions as a quarter wavelength plate when no voltage is applied, and allows the outside light to pass and displays white cooperatively with the polarization plate 70 and the quarter wavelength plate 80. When a voltage is applied, the nematic liquid crystal layer 3 changes to perpendicular orientation and loses its function of a quarter wavelength plate, and shuts the outside light and displays black cooperatively with the polarization plate 70 and the quarter wavelength plate 80.

Continuously, the respective components are described in detail hereinafter with reference to FIG. 4. As described herein above, the polarization plate 70 is placed over the surface of the first substrate 1 of the panel 0. The quarter wavelength plate 80 is interposed between the polarization plate 70 and the first substrate 1. The quarter wavelength plate 80 comprises, for example, stretched polymer film, and gives a phase difference corresponding to a quarter wavelength between the ordinary light and extraordinary light. The optical axis (one anisotropic axis) of the quarter wavelength plate 80 is oriented so as to make an angle of 45 degrees to the polarization axis (i.e., the transmission axis) of the polarization plate 70. The outside light becomes a linearly polarized light after transmission through the polarization plate 70. The linearly polarized light becomes a circularly polarized light after transmission through the quarter wavelength plate 80. The circularly polarized light becomes a linearly polarized light again after transmission through the quarter wavelength plate. In this case, the polarization direction turns 90 degrees from the original polarization direction. As described herein above, the quarter wavelength plate is capable of turning the polarization direction by combining with the polarization plate, and this phenomenon is used for display.

The panel 0 uses the nematic liquid crystal layer 3 consisting of nematic liquid crystal molecules 4 having basically positive horizontally oriented dielectric anisotropy as the electro-optical material. The nematic liquid crystal layer 3 having a suitable thickness functions as a quarter wavelength plate. In this example, refractive index anisotropy Δn of the nematic liquid crystal layer 3 is approximately 0.7, and the thickness of the nematic liquid crystal layer 3 is, for example, approximately 3 μm. Therefore, the retardation Δn·d of the nematic liquid crystal layer 3 ranges from 0.2 to 0.25 μm. As shown in the drawing, the above-mentioned retardation value becomes approximately 0.15 μm (150 nm) substantially by twist orientation of the nematic liquid crystal molecules 4. This value corresponds approximately to ¼ median wavelength (approximately 600 nm) of the outside light, and the nematic liquid crystal layer 3 is capable of functioning optically as a quarter wavelength plate. The nematic liquid crystal layer 3 is placed between the top and bottom orientation films 6 and 7 made of, for example, polyimide to obtain a desired twist orientation. The liquid crystal molecules 4 are arranged along the rubbing direction of the orientation film 6 on the first substrate 1 side, and the liquid crystal molecules 4 are arranged along the rubbing direction of the orientation film 7 on the second substrate 2 side. The rubbing direction of the orientation film 6 and the orientation film 7 is deviated by 60 to 70 degrees from each other to obtain the desired twist orientation.

The light reflection layer 8 is formed under the electrode 11 on the second substrate 2 side. The light reflection layer 8 has convexes and concaves on the surface and scatters the light. Therefore, the appearance is paper white, which is preferable as display background, and because the light reflection layer 8 reflects the incident light in the relatively wide angle range, the wide visible angle is realized for easy viewing of the display and the brightness of the display increases in the wide angle of view range. The transparent planarization layer 12 made of, for example, acrylic resin is interposed between the light reflection layer 8 and the electrode 11 to planarize the convexes and concaves. The light reflection layer 8 comprises a resin film 15 shaped in the form of convex and concave and a metal film 16 consisting of aluminum formed on the surface of the resin film 15. The resin film 15 is a photo-sensitive resin film patterned in the form of convex and concave by means of photo-lithography. The photo-sensitive resin film 15 consists of, for example, photo-resist which is coated over the entire surface of the substrate. The photo-resist is exposed to the light with interposition of a desired mask to pattern in the form of, for example, cylinder. Next, the photo-resist is subjected to heating and reflow to form stably convexes and concaves. On the convex and concave surface formed as described herein above, the metal film 16 with a desired thickness, made of, for example, aluminum, which has good reflectance, is formed. The convex and concave depth of several μm brings about good light scattering characteristics, and the light reflection layer 8 colors white. On the surface of the light reflection layer 8, the planarization layer 12 is formed to planarize the convex and concave surface. The planarization layer 12 consists desirably of a transparent organic substance such as acrylic resin. The interposition of the planarization layer 12 helps the electrode 11 and the orientation film 7 to be formed stably.

Figure 5A:
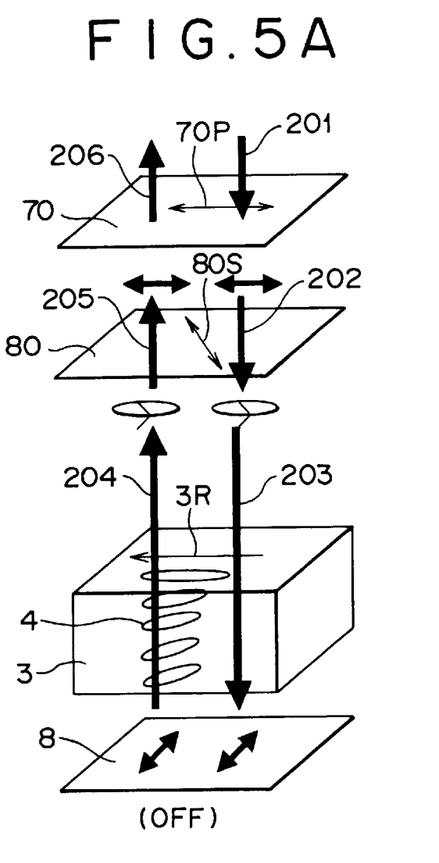
FIGS. 5A and 5B together are a schematic view for describing operations of the example shown in FIG. 4.
Figure 5B:
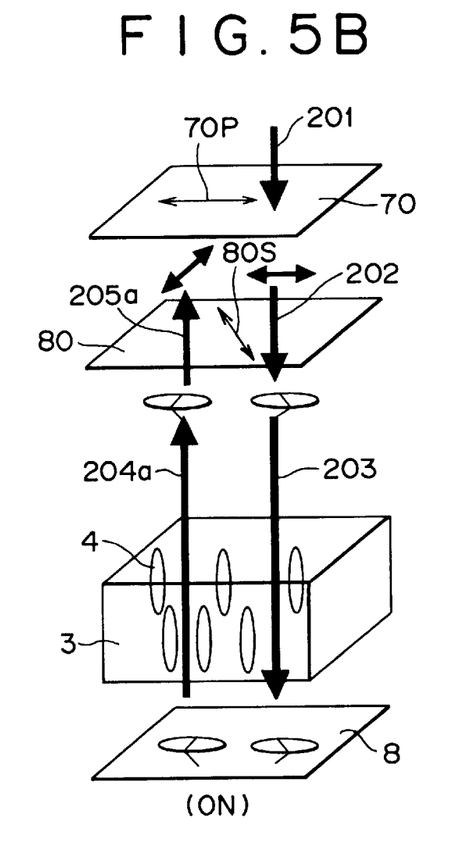

Basic operations of the reflective display shown in FIG. 4 is described in detail with reference to FIGS. 5A and 5B. In the drawing, (OFF) shows the state of no applied voltage and (ON) shows the state of applied voltage. As shown in (OFF), this reflective display has the structure that the polarization plate 70, the quarter wavelength plate 80, the nematic liquid crystal layer 3, and the light reflection layer 8 are placed one on another in the order in the view from an observer. Herein, the light guide plate is omitted for easy understanding. The polarization axis (transmission axis) of the polarization plate 70 is represented with 70P. The optical axis 80S of the quarter wavelength plate 80 makes an angle of 45 degrees to the transmission axis 70P. Further, the orientation direction 3R of the liquid crystal molecules 4 of the first substrate side is parallel to the polarization axis (transmission axis) of the polarization plate 70.

The incident light 201 becomes a linearly polarized light 202 after transmission through the polarization plate 70. The polarization direction is parallel to the transmission axis 70P, and the linearly polarized light 202 is referred to as parallel linearly polarized light hereinafter. The parallel linearly polarized light 202 is converted to a circularly polarized light 203 after transmission through the quarter wavelength plate 80. The circularly polarized light 203 is converted to a linearly polarized light after transmission through the nematic liquid crystal layer 3 which functions as a quarter wavelength plate. The polarization direction of the linearly polarized light is turned 90 degrees and intersects with the parallel linearly polarized light 202 perpendicularly. Herein this linearly polarized light turned 90 degrees is referred to as orthogonal linearly polarized light. The orthogonal linearly polarized light 203 is reflected on the light reflection layer 8, and passes again through the nematic liquid crystal layer 3 which functions as a quarter wavelength plate 80, where the orthogonal linearly polarized light 203 is converted to a circularly polarized light 204. Further the circularly polarized light 204 passes through the quarter wavelength plate 80, where the circularly polarized light 204 is converted to an original parallel linearly polarized light 205. The parallel linearly polarized light 205 passes through the polarization plate 70 and converted to a coming out light 206, which is viewed by an observer, and white display is obtained.

In the state of applied voltage shown in (ON), the liquid crystal molecules 4 are shifted from twist orientation to perpendicular orientation, and lose the quarter wavelength plate function. The outside light 201 which passes the polarization plate 80 is converted to a parallel linearly polarized light 202. The parallel linearly polarized light 202 is converted to a circularly polarized light 203 when the parallel linearly polarized light 202 passes through the quarter wavelength plate 80. The circularly polarized light 203 is passed through the nematic liquid crystal layer 3 as it is, reflected on the light reflection layer 8, and comes to the quarter wavelength plate 80 as it is the circularly polarized light 204a. The circularly polarized light 204a is converted to an orthogonal linearly polarized light 205a when the circularly polarized light 203 passes through the quarter wavelength plate 80. Because the orthogonal linearly polarized light 205a can not pass the polarization plate 70, the display turns to black.

Figure 6:
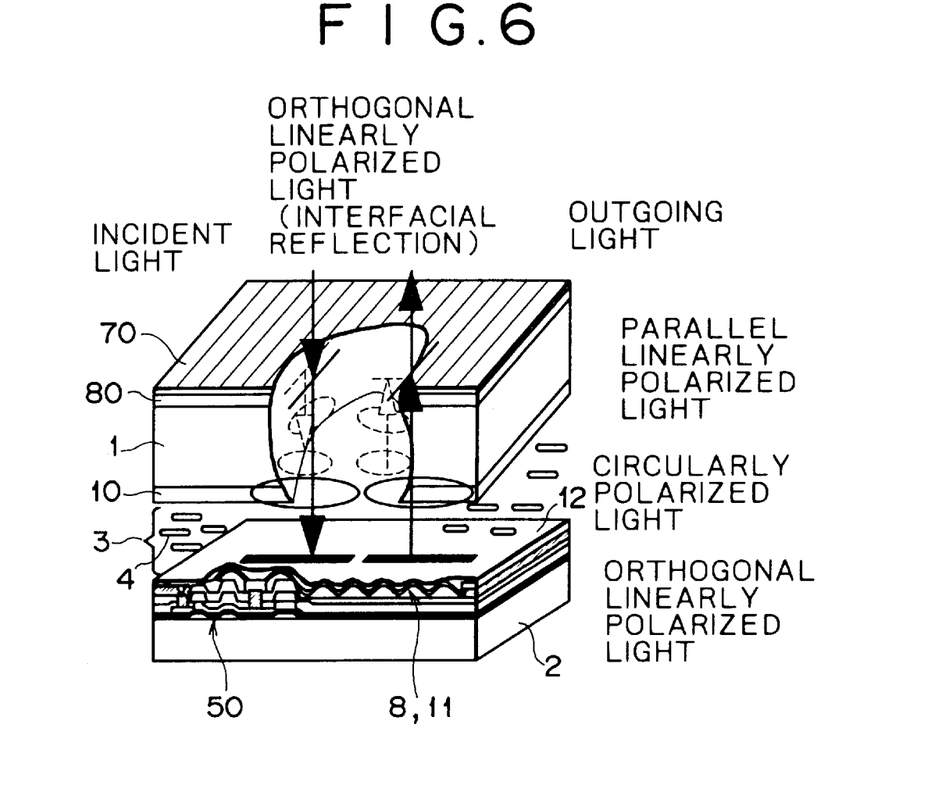
FIG. 6 is a partially cut-away perspective view for illustrating another example of a reflective display in accordance with the present invention.

Further, for easy understanding of the present invention, suppression operations of unnecessary reflection are described with reference to an example shown in FIG. 6. As shown in the drawing, the reflective display has a structure comprising the polarization plate 70, the quarter wavelength plate 80, the first substrate 1, the electrode 10, the liquid crystal layer 3, the planarization layer 12, the light reflection layer 8, and the second substrate 2 laminated in that order from the top. For easy understanding, the light guide plate is omitted from the drawing. In this example, the light reflection layer 8 is served also as the electrode 11. The electrode 11 is divided into the matrix form, and functions as the pixel electrode. Individual electrodes are driven by the thin film transistor 50 consisting of, for example, polysilicon, and forming a so-called active matrix type display apparatus. The transmission axis of the polarization plate 70 is shown by the stripe pattern as shown in the drawing. The optical axis of the quarter wavelength plate 80 makes an angle of 45 degrees to the transmission axis (polarization axis) of the polarization plate 70. The liquid crystal layer 3 functions as a quarter wavelength plate in an OFF state. The incident light such as illumination light or outside light is converted to a parallel linearly polarized light when the incident light passes though the polarization plate 70. The parallel linearly polarized light is converted to a circularly polarized light when the parallel linearly polarized light passes through the quarter wavelength plate 80. Further, the circularly polarized light is converted to an orthogonal linearly polarized light when the circularly polarized light passes the liquid crystal layer 3. The orthogonal linearly polarized light is reflected on the light reflection layer 8, converted to a circularly polarized light by the liquid crystal layer 3, and further converted to a parallel linearly polarized light by the quarter wavelength plate 80. Therefore, the parallel linearly polarized light passes through the polarization plate 70 without changing and comes to an observer as a coming out light. The incident light converted to the circularly polarized light by the quarter wavelength plate 80 is partially mirror reflected on the interface between the electrode 10 and the substrate 1. The mirror reflected unnecessary circularly polarized light is converted to an orthogonal linearly polarized light by the quarter wavelength plate 80. The orthogonal linearly polarized light reflected on the interface is absorbed because the polarization plane is orthogonal to the transmission axis. Therefore, unnecessary reflected light is always absorbed, thus the image quality of the reflective display in accordance with the present invention is improved. In the reference example shown in FIG. 2, it is possible to suppress unnecessary reflection on the interface between the panel and the light guide plate by bonding the light guide plate and the panel together with a transparent resin. However, by the method in which a transparent resin is used, it is impossible to suppress unnecessary reflection on the interface between the electrode 10 and the substrate 1. On the other hand, by the method of the present invention in which the laminate structure comprising a polarizing plate and a quarter wavelength plate is used, it is possible to shut off not only unnecessary reflection on the interface between the panel and the light guide plate but also unnecessary reflection on the interface between the electrode and the substrate.

Figure 7:
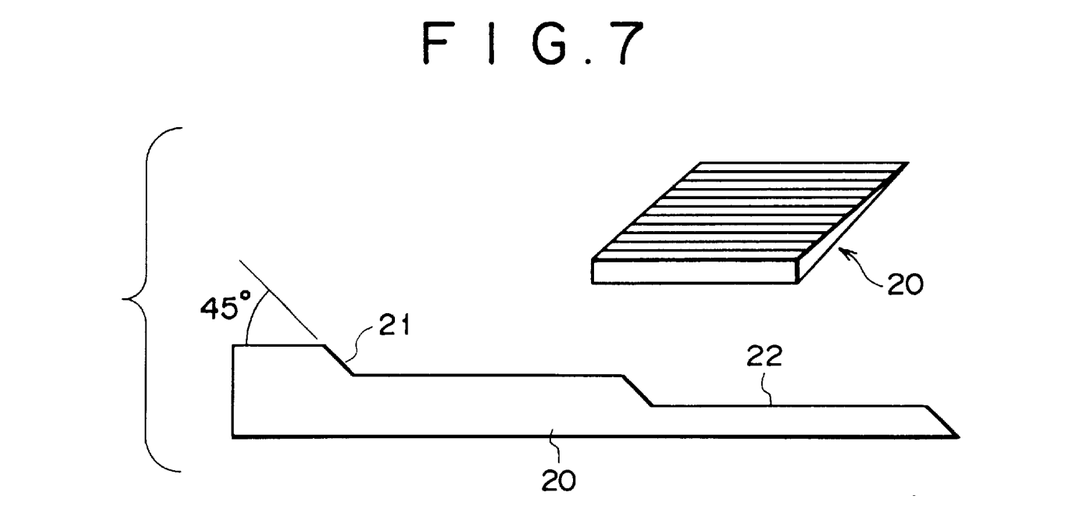
FIG. 7 is a schematic view for illustrating a reference example of a light guide plate.

Suppression of unnecessary reflection on the interface between an electrode and a substrate is particularly effective for improvement of the image quality of a reflective display which uses a light guide plate having a periodical structure. Suppression of unnecessary reflection results in removal of interference fringe. Removal of interference fringe is described in detail hereinunder. As described hereinbefore, the reflective display is promising as the display of mobile information terminals because of low power consumption. However, differently from a transmission display apparatus which uses back light, an image can not be viewed in a dark environment in the case of a reflective display. To solve this problem, a light guide plate is used in the present invention as described hereinabove. A typical structure of a light guide plate is shown in FIG. 7. As described repeatedly, the light guide plate 20 is placed on the glass substrate on the front side of the reflection panel. The light guideplate 20 comprises, for example, slant portions 21 having a slant angle of 45 degrees and plane portions 22 which are parallel to the glass substrate of the panel, and forms a diffraction grating having a periodical structure.

Figure 8:
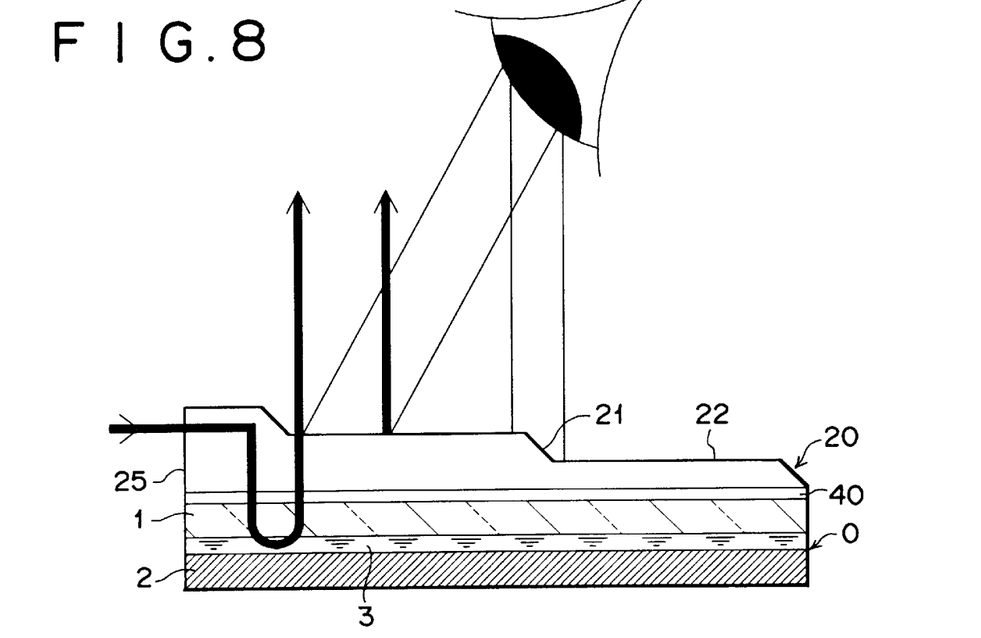
FIG. 8 is a schematic view for illustrating a reference example of a reflective display which uses the light guide plate shown in FIG. 7.

FIG. 8 is a schematic diagram for illustrating a reference example in which the light guide plate 20 shown in FIG. 7 is bonded to the panel 0 with a transparent interposition layer 40. A light source comprising, for example, a cold cathode tube is provided near the end 25 of the light guide plate 20. The illumination light emitted from the cold cathode tube is incident horizontally from the end 25 and totally reflected perpendicularly downward on the slant portions 21 having a slant angle of 45 degrees. The reflected light illuminates the reflection panel 0 from the front side. The image screen is viewed with illumination of the environment (outside light) in a bright environment. On the other hand, in a dark environment, the cold cathode tube is lighted to illuminate the panel 0, and the image screen is viewed. However, if the light guide plate 20 is located directly on the front side of the reflection panel, the image screen is viewed not clearly because of generation of interference fringe due to the periodical structure of the light guide plate 20. When the illumination light emitted from the light source is totally reflected perpendicularly downward by the light guide plate 20, the illumination light is subjected to diffraction due to the periodical structure of the light guide plate 20, and the first order light, second order light , . . . are generated in addition to the zero order light. The illumination light reflected from the panel 0 passes again the light guide plate 20. Also when, the illumination light is subjected to diffraction, and the zero order light, the first order light, . . . are generated. The zero order light and the first order light generated from two diffractions interfere each other, as the result, a bright and dark stripe pattern is viewed with overlapping on the image screen. The stripe pattern causes unclear visibility of the display. Particularly when the image screen is viewed from the position deviated opposite to the light source from the front of the panel, the interference fringe becomes remarkable. In other words, when the visual line of an observer is inclined to the side facing to the slant plane of the slant portions 21, the interference fringe becomes remarkable. The larger the inclination of the visual line, the clearer the interference fringe (moiré) becomes.

Figure 9A:
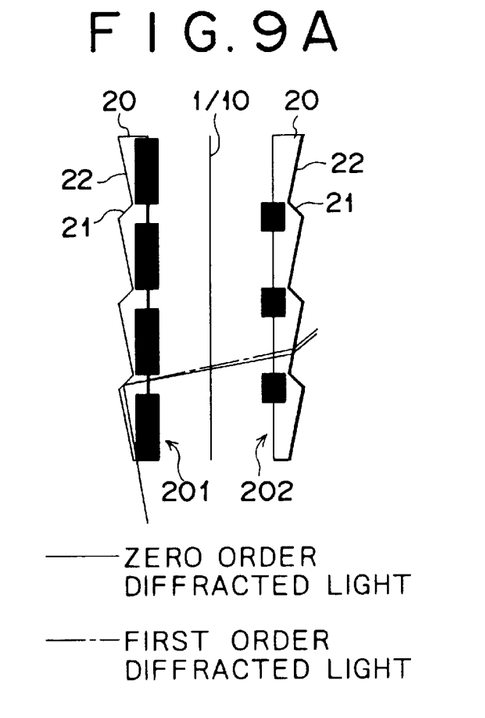
FIGS. 9A and 9B are diagrams for describing the cause of moire generation which appears in the reference example of the reflective display shown in FIG. 8.
Figure 9B:
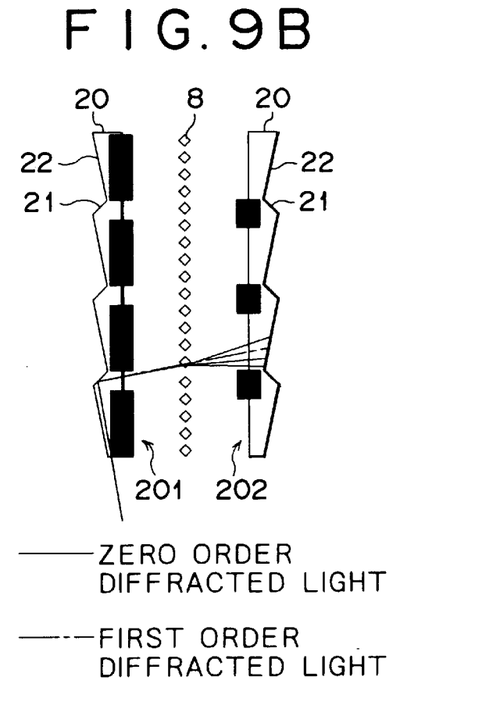

FIGS. 9A and 9B show schematically generation of moiré. FIG. 9A is a drawing with addressing on unnecessary illumination light reflected on the interface $^1/_{10}$ between the first substrate 1 consisting of glass and the electrode 10 comprising a transparent conductive film consisting of ITO. FIG. 9B is a drawing with addressing on the primary illumination light reflected on the light reflection layer 8 formed on the second substrate. In both drawings, the light guide plate 20 is folded with respect to the reflection plane for easy understanding. As shown in FIG. 9A, the light guide plate 20 functions as a sort of diffraction grating 201 because the slant portions 21 and plane portions 22 are arranged periodically. The illumination light which has passed the diffraction grating 201 is subjected to mirror reflection on the interface $^1/_{10}$ and passes again through the light guide plate 20, when the light guide plate 20 functions as a diffraction grating 202. A pair of diffraction gratings 201 and 202 are complementary each other. Equivalently, as the result, the illumination light passes the diffraction gratings 201 and 202, and reaches an observer. The first order diffracted light and the second order diffracted light interfere with each other to form a moiré. For example, the illumination light is divided into the zero order diffracted light and the first order diffracted light by the diffraction grating 201. These diffracted lights are subjected again to diffraction by the diffraction grating 202, and divided to the zero order diffracted light and the first order diffracted light. Particularly, the first order diffracted light generated from the first zero order diffracted light and the zero order diffracted light generated from the first order diffracted light interfere strongly with each other because the total of the order is equal to each other. The parallel incident light from the cold cathode tube is reflected by the slant portions 21 of the light guide plate, and proceeds to the interface 1/10 as it is. The light subjected to mirror reflection on the interface is a parallel light. The parallel incident light and the parallel reflected light interfere each other because these lights pass the nearly same path. This interference is the cause of moiré.

On the other hand, as shown in FIG. 9B, the illumination light reflected on the light reflection layer 8 which scatters the light in nature is not involved in interference. The illumination light reflected on the light reflection layer 8 contains the zero order diffracted light and the first order diffracted light mixedly, is not involved in interference, and causes no moiré pattern.

To suppress the above-mentioned moiré, in the present invention, the laminate structure comprising the polarization plate 70 and the quarter wavelength plate 80 is attached on the back side of the light guide plate 20. The polarization plate 70 and the quarter wavelength plate 80 function cooperatively to suppress unnecessary reflection of the illumination light on the electrode 10. As the result, it is possible to remove substantially the morié due to the periodical structure of the light guide plate 20.

As described hereinbefore, according to the present invention, a light guide plate is placed on the reflection type panel and an auxiliary illumination light source is provided on the end of the light guide plate. The light guide plate allows normally the outside light to be transmitted, which is incident on the panel, and allows the outside light reflected on the panel to come out. On the other hand, the light guide panel guides the illumination light as required, which is incident on the panel, and allows the illumination light reflected on the panel to come out. An image is observable in a dark environment though this is a reflection type panel by lighting the light source. On the other hand, in a bright environment with plenty of outside light, the light source is turned off to save the power. A laminate structure comprising a polarization plate and a quarter wavelength plate is attached on the back side of the light guide plate to shut off unnecessary reflection of the panel, and thus the quality of a display screen is improved.

What is claimed is:

1. A reflective display comprising:
a panel having a transparent first substrate located on the incident side of outside light, a second substrate bonded to said first substrate with interposition of a prescribed space and located on the side opposite to said first substrate, an electro-optical substance held in said space, and an electrode for applying a voltage to said electro-optical substance formed at least on any one of said first substrate and said second substrate;
a lighting apparatus having a transparent light guide plate placed on the outside of said first substrate, and a light source provided on the end of said light guide plate for emitting the illumination light as required,
wherein said light guide plate normally allows the outside light to be transmitted, which is incident on said first substrate, and allows the outside light reflected on said second substrate to come out, on the other hand, said light guide plate guides the illumination light as required, which is incident on said first substrate, and allows the illumination light reflected on said second substrate to come out;
a polarization plate; and
a quarter wavelength plate,
wherein a lamination structure of said polarization plate and said quarter wavelength plate are attached on said light guide plate one on the other, and the outside light or the illumination light reflected unnecessarily on the first substrate of said panel is shut off.

2. A reflective display as claimed in claim 1, wherein said panel uses a liquid crystal layer as the electro-optical substance which functions as a quarter wavelength plate depending on application of a voltage.

3. A reflective display as claimed in claim 1, wherein said electro-optical substance consists of a twist-oriented nematic liquid crystal layer having a positive dielectric anisotropy, functions as a quarter wavelength plate when no voltage is applied, and loses the quarter wavelength plate function when a voltage is applied.

4. A reflective display as claimed in claim 1, wherein said light guide plate has plane portions divided in the form of stripe and slant portions located between adjacent plane portions, and functions to reflect the illumination light guided from said light source on the respective slant portions toward the first substrate, and functions to allow the illumination light reflected on the second substrate to come out from the respective plane portions.

5. A reflective display as claimed in claim 1, wherein the laminate structure of said polarization plate and said quarter wavelength plate is disposed between said panel and said light guide plate.

* * * * *